United States Patent
Kaneko et al.

(10) Patent No.: US 6,336,485 B1
(45) Date of Patent: Jan. 8, 2002

(54) PNEUMATIC RADIAL TIRE INCLUDING BLOCKS HAVING DIFFERENT LENGTHS

(75) Inventors: Takashi Kaneko, Hanno; Kenjiro Yamaya, Kodaira, both of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/262,074

(22) Filed: Mar. 4, 1999

(30) Foreign Application Priority Data

Mar. 4, 1998 (JP) ............................................. 10-051979

(51) Int. Cl.$^7$ ......................... B60C 11/11; B60C 11/13; B60C 101/00; B60C 103/00; B60C 113/00
(52) U.S. Cl. ............................. 152/209.3; 152/209.21; 152/209.24
(58) Field of Search .......................... 152/209.2, 209.3, 152/209.18, 209.24, 209.21

(56) References Cited

U.S. PATENT DOCUMENTS

| | | | | |
|---|---|---|---|---|
| 4,777,993 A | * | 10/1988 | Yamashita et al. | 152/209.3 |
| 4,796,683 A | * | 1/1989 | Kawabata et al. | 152/209.24 |
| 5,205,879 A | * | 4/1993 | Seitz et al. | 152/209.3 |
| 5,618,360 A | * | 4/1997 | Sakuno | 152/209.3 |
| 5,628,843 A | * | 5/1997 | Hanya | 152/209.3 |
| 5,814,169 A | * | 9/1998 | Yamaguchi et al. | 152/209.24 |

FOREIGN PATENT DOCUMENTS

| | | | | |
|---|---|---|---|---|
| AU | 584170 | * | 9/1986 | ............. 152/209.3 |
| DE | 4433420 | | 3/1996 | |
| EP | 411773 | | 2/1991 | |
| EP | 438319 | | 7/1991 | |
| EP | 0 591 002 A2 | | 4/1994 | |
| JP | 63-57304 | | 3/1988 | |
| JP | 1-204805 | * | 8/1989 | ............. 152/209.24 |
| JP | 2-109705 | * | 4/1990 | ............. 152/209.3 |
| JP | 3-220005 | | 9/1991 | |
| JP | 4-100707 | * | 4/1992 | ............. 152/209.24 |
| JP | 4-146805 | * | 5/1992 | ............. 152/209.3 |
| JP | 8-25914 | | 1/1996 | |

OTHER PUBLICATIONS

Abstracts for German 4433420.*

* cited by examiner

Primary Examiner—Steven D. Maki
(74) Attorney, Agent, or Firm—Sughrue Mion, PLLC

(57) ABSTRACT

A pneumatic radial tire comprises a radial carcass, a belt, and a row of many blocks having different lengths along a circumference of a ground contact region under pitch variation defined in a tread rubber of the tread portion by at least two straight main grooves and a plurality of lateral subgrooves extending between the mutual main grooves at an inclination angle of less than 90° with respect to the circumference of the ground contact region, in which the block row satisfies such relationships that an inclination angle $\phi_L$ of an edge of a long-pitch block is larger than that $\phi_S$ of an edge of a short-pitch block and an inclination angle $\alpha_L$ of each block wall face of a long-pitch block is larger than that $\alpha_S$ of each block wall face of a short-pitch block, or further an inclination angle $\beta_S$ of a block wall face of a short-pitch block is larger than that $\beta_L$ of a block wall face of a long-pitch block.

4 Claims, 4 Drawing Sheets

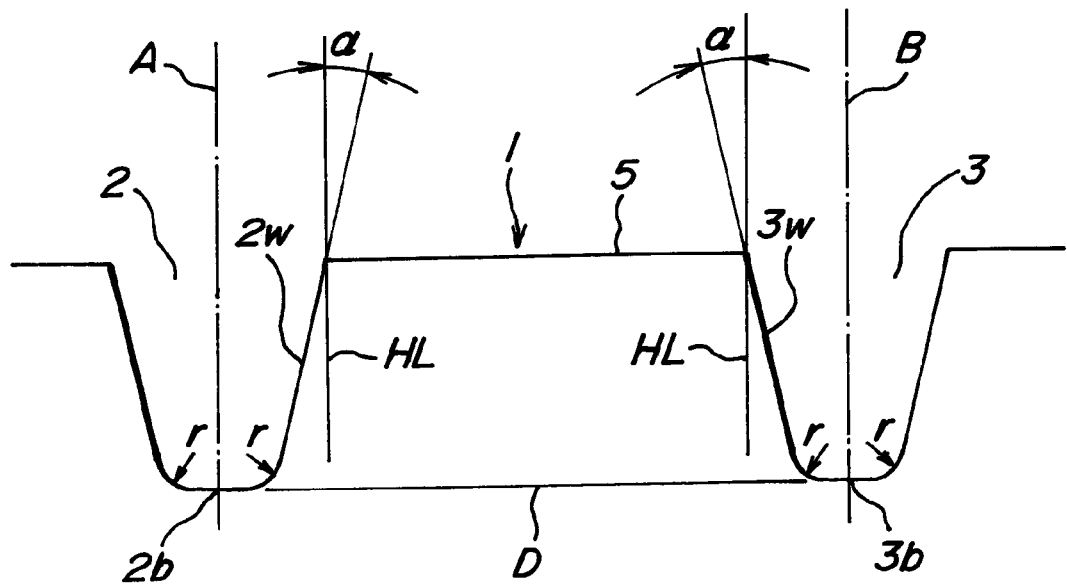
FIG_2
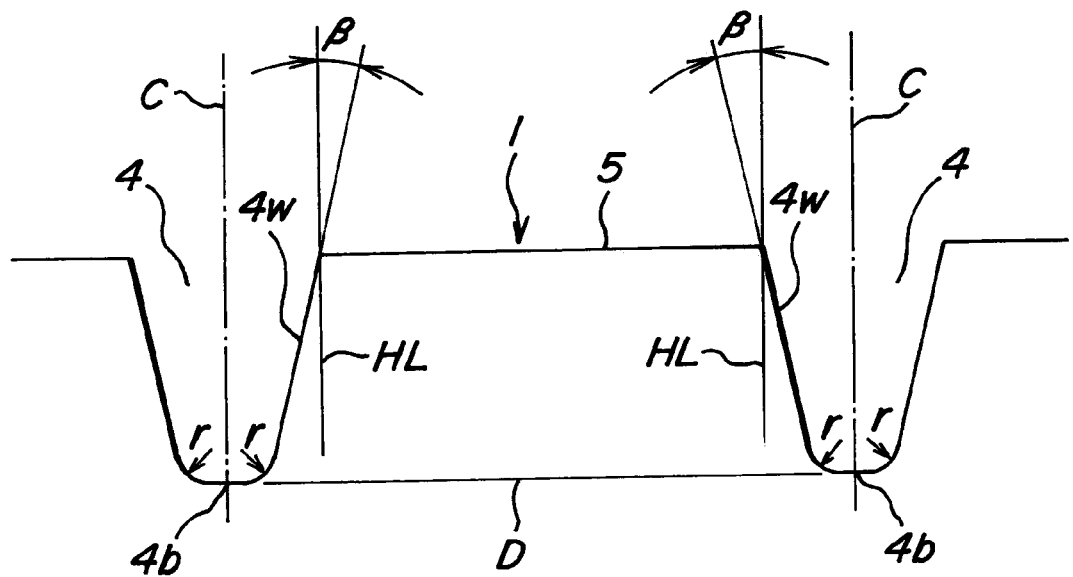
FIG_3

Inclination angle of wall face 2w, 3w in long-pitch block

PNEUMATIC RADIAL TIRE INCLUDING BLOCKS HAVING DIFFERENT LENGTHS

BACKGROUND OF THE INVENTION

1. Field of the Invention

This invention relates to a pneumatic radial tire, and more particularly to a high-performance pneumatic radial tire capable of considerably improving straight running stability and steering stability while maintaining other properties at a high level and suitable for use in vehicles such as passenger cars.

2. Description of Related Art

In order to enhance the wet skid resistance and resistance to hydroplaning required in a high-performance tire, when a tread pattern formed in a tread rubber is a pattern including block groups defined by at least two main straight grooves extending along a circumference of a ground contact region and lateral sub-grooves arranged therebetween or a block pattern formed over substantially a full ground contact region, a level of noise called as a pattern noise is apt to be increased as compared with that in a rib pattern. Therefore, in order to reduce such a noise level, it is required to adopt a pitch variation wherein pitch lengths arranged in the pattern along the circumference of the ground contact region are changed at a given ratio.

When the pitch variation is applied to rows of many blocks along the circumference of the ground contact region, there is a first case where inclination angles of block wall faces along the straight main groove are the same in the same block row, or even if the inclination angle is changed in one block in view of the pattern design, the change of the inclination angle is the same in all blocks of the same block row irrespective of various pitches.

There is a second case where inclination angles of the block wall faces along the lateral sub-groove arranged for defining the block and having a given inclination angle with respect to a direction of tire rotating axis (hereinafter abbreviated as axial direction) in the same block row are (1) the same in all blocks for facilitating the manufacture of a vulcanization mold or (2) are made larger in a long pitch than those in a short pitch.

In order to ensure a good drainage property during running on a wet road surface, it is general known to incline the lateral sub-grooves in the same direction with respect to the axial direction in the same block row. In this case, it is known that the inclination angle of the lateral sub-groove with respect to the axial direction is made larger in the block of long pitch than in the block of short pitch or is the same irrespective of various pitches as a third case.

In the tire having a combination of the first and second cases with the third case wherein the inclination angles of the lateral sub-grooves differ in blocks having long and short pitches, values obtained by dividing axial rigidities of long-pitch and short-pitch blocks by their pitch lengths or axial rigidities of long-pitch and short-pitch blocks per unit length along the circumference of their ground contact region become smaller in the long-pitch block having a larger degree of acute angle and larger in the short-pitch block having a smaller degree of acute angle.

In the pattern having block rows of many pitch-varied blocks, larger rigidity zones and smaller rigidity zones are existent together in a tread rubber portion in the ground contact region of the tire rotating under loading in the axial direction. Because, it is effective to arrange blocks having the same pitch only by certain number in order to more enhance the effect through the pitch variation and hence the block row is divided into certain number of long-pitch block groups and certain number of short-pitch block groups. Therefore, the tread portion has long-pitch and short-pitch block rigidity zones in the axial direction along the circumference of the ground contact region. The result is that the block row having uniform rigidity zones is not obtained.

Such a presence of long-pitch and short-pitch block rigidity zones along the circumference brings about the change of cornering force quantity produced every one rotation of the tire or the change of cornering power. Such a change does not count for so much in the low speed to middle speed running of the vehicle, but causes swaying of the vehicle from side to side in the high-speed straight running or a problem of degrading the straight running stability and the steering stability in the cornering at a relatively high speed. In case of high-performance radial tires to be lately and increasingly mounted onto a high-performance vehicle, it is particularly demanded to highly develop the above both performances, so that the above problem becomes serious.

In the tire having a combination of the first and second cases with the third case wherein the inclination angles of the sub-grooves in all blocks are the same irrespective of the various pitches, there is a risk of simultaneously contacting the sub-grooves the ground in the running under loading, which brings about the occurrence of tire noise through impact sound or the like. Therefore, it is a general means to arrange grooves extending in the lateral direction in the circumferential direction while changing the inclination angle.

SUMMARY OF THE INVENTION

It is, therefore, an object of the invention to provide a pneumatic radial tire provided with a tread pattern having a row of many blocks formed under pitch variation contributing to lower noise which can improve both straight running stability and steering stability while maintaining a necessary low noise level and further holding other performances such a ride comfortability and the like at a high level.

According to a first aspect of the invention, there is the provision of a pneumatic radial tire comprising a radial carcass of at least one ply toroidally extending between a pair of bead cores each embedded in a bead portion, a belt reinforcing a tread portion on an outer periphery of the carcass, and a row of many blocks having different lengths along a circumference of a ground contact region under pitch variation defined in a tread rubber of the tread portion by at least two straight main grooves extending along the circumference of the ground contact region and a plurality of lateral sub-grooves extending between the mutual main grooves at an inclination angle of less than 90° with respect to the circumference of the ground contact region, in which the block row satisfies a relationship of $\phi_L > \phi_S$ as to an inclination angle ($\phi$) of an edge of the block along the sub-groove with respect to a straight line passing through a top of an acute angle portion of the block and perpendicular to an equatorial plane of the tire wherein $\phi_L$ is an inclination angle of a long-pitch block and $\phi_S$ is an inclination angle of a short-pitch block, and a relationship of $\alpha_L > \alpha_S$ as to an inclination angle ($\alpha$) of each block wall face along both the straight main grooves with respect to a length of each block surface along the circumference of the ground contact region wherein $\alpha_L$ is an inclination angle of a block wall face having a longer surface length and $\alpha_S$ is an inclination angle of a block wall face having a shorter surface length.

According to a second aspect of the invention, there is the provision of a pneumatic radial tire comprising a radial carcass of at least one ply toroidally extending between a pair of bead cores each embedded in a bead portion, a belt reinforcing a tread portion on an outer periphery of the carcass, and a row of many blocks having different lengths along a circumference of a ground contact region under pitch variation defined in a tread rubber of the tread portion by at least two straight main grooves extending along the circumference of the ground contact region and a plurality of lateral sub-grooves extending between the mutual main grooves at an inclination angle of less than 90° with respect to the circumference of the ground contact region, in which the block row satisfies a relationship that as to an inclination angle ($\beta$) of each block wall face along the sub-groove with respect to a length of each block surface along the circumference of the ground contact region, an inclination angle ($\beta_S$) of a block wall face having a shorter surface length is made larger than an inclination angle ($\beta_L$) of a block wall face having a longer surface length.

Of course, the tire can be manufactured by combining the first aspect with the second aspect. In each of the first and second aspects, the pitch variation is a random arrangement of two or more pitch lengths, desirably three or more pitch lengths.

In a preferable embodiment of the invention, a ratio of a full volume of a block to a full volume of a groove existing in each pitch defined by different pitch lengths based on the pitch variation is made even over a full is circumference of the ground contact region. In this case, the full volume of the groove existing in each pitch is a groove volume existing in a space defined by four faces dividing each of groove widths of the two main grooves and the two sub-grooves for the formation of a certain block into two parts and a ground contact face and its extension face, while the full volume of the block is a volume of a block occupied in a solid defined by the above faces and a phantom face (usually a curved face) smoothly connecting groove bottoms of the two main grooves to each other. Also, the even value of the ratio means a value that a difference between the maximum value and minimum value in the ratio of the full volume of the block to the full volume of the groove existing in each pitch is not more than 0. 1.

In another preferable embodiment of the invention, the inclination angle of the block wall face directing from the surface of the block toward the bottom of the main groove is gradually decreased over a region ranging from an acute end to an obtuse end in a surface form of each block, which enhances the rigidity of each block in the axial direction and largely contributes to improve both the straight running stability and the steering stability.

BRIEF DESCRIPTION OF THE DRAWINGS

The invention will be described with reference to the accompanying drawings, wherein:

FIG. 2 is a schematically section view taken along a line II—II of FIG. 1;

FIG. 3 is a schematically section view taken along a line III—III of FIG. 1;

DESCRIPTION OF PREFERRED EMBODIMENTS

Figure 1:
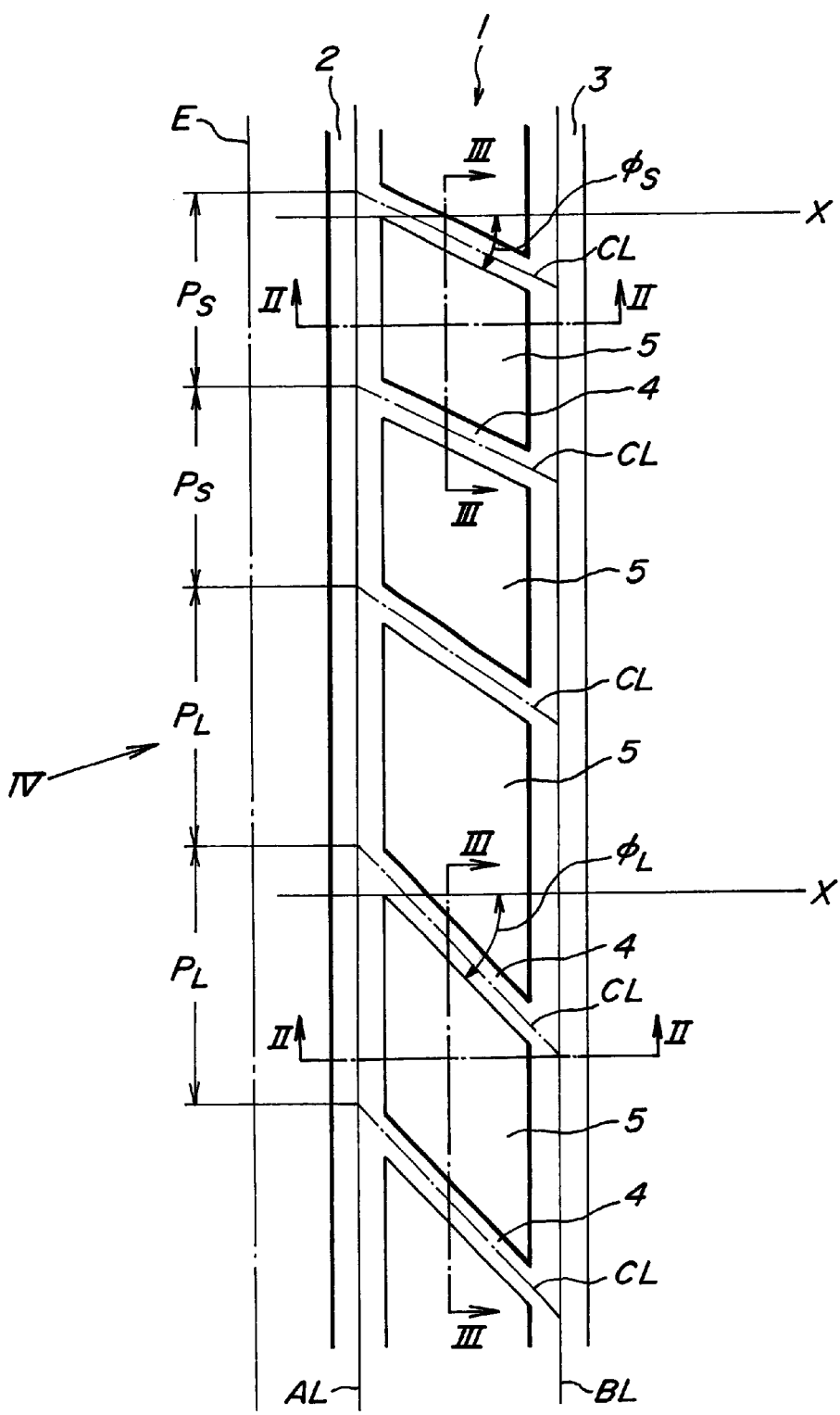
FIG. 1 is a partial right-side developed view of an embodiment of the tread pattern according to the invention.

The pneumatic radial tire according to the invention (hereinafter abbreviated as a tire) comprises a radial carcass of one or more plies toroidally extending between a pair of bead cores each embedded in a bead portion and a belt reinforcing a tread portion on an outer periphery of the radial carcass though these members are omitted in the drawing.

In FIG. 1 is shown a part of a right-side half of a ground contact region 1 in a tread rubber (omitted in the drawing) constituting an outer part of the tread portion. The tread rubber comprises at least two straight main grooves (hereinafter abbreviated as main groove) 2, 3 (two in the illustrated embodiment) extending along a circumference of the ground contact region 1 in parallel to an equatorial plane E of the tire (shown by a dash-single dot line) and a plurality of lateral sub-grooves 4 (hereinafter abbreviated as sub-groove) 4 extending between these main grooves 2 and 3 and opening to the respective main grooves 2, 3.

As shown in FIG. 1, a row of many blocks 5 is defined along the circumference of the ground contact region 1 by grooves 2, 3 and sub-grooves 4. These blocks S are formed in a random arrangement under a pitch variation having two or more pitches, desirably three or more pitches. In FIG. 1 is shown two pitches $P_S$, $P_L$ for convenience' sake. In this case, the pitches PS, PL are defined on a width bisector line AL of the main groove 2 near to the equatorial plane E in the ground contact region 1. In the illustrated embodiment, these pitches have a relation of $P_L>P_S$, and a length of the block 5 along the circumference of he ground contact region 1 is also longer in the pitch $P_L$ than in the pitch $P_S$.

According to the invention, as shown in FIG. 1, an inclination angle $\phi$ of an edge of the block S facing the sub-groove 4 with respect to a straight line X passing through a top of an acute portion of the block 5 and perpendicular to the equatorial plane E of the tire is changed in accordance with the size of pitch length in such a manner that an inclination angle $\phi_S$ of a block having a short pitch $P_S$ and an inclination angle $\phi_L$ of a block having a long pitch $P_L$ always satisfy a relationship of $\phi_L>\phi_S$. Here, the above relationship of $\phi_L>\phi_S$ has a meaning that even when three or more pitches are existent in the block row, the great and small relation is necessarily existent between a certain pitch and another pitch and hence the relationship of $\phi_L>\phi_S$ should always established between these pitches.

Referring to a combination of FIG. 1 with FIG. 2 showing a section taken along a line II—II, inclination angles $\alpha$ of wall faces $2_W$, $3_W$ of each of the blocks 5 existing between the main grooves 2 and 3 with respect to a widthwise direction of the ground contact region 1 (direction perpendicular to the equatorial plane E of the tire) are changed in accordance with the size of the pitch length in such a manner that an inclination angle $\alpha_S$ of a block 5 in the short pitch $P_S$ and an inclination angle $\alpha_L$ of a block 5 in the long pitch $P_L$ always satisfy a relationship of $\alpha_L>\alpha_S$. Moreover, the line II—II shown in FIG. 1 is a straight line extending in a direction perpendicular to the equatorial plane E of the tire.

The long and short pitch lengths correspond to long and short surface lengths of the blocks 5 along the circumference of the ground contact region 1. The relationship of $\alpha_L>\alpha_S$ has the same meaning as the aforementioned relationship of $\phi_L>\phi_S$. In other words, the inclination angle $\alpha_L$ of the block 5 having a longer surface length is larger than the inclination angle $\alpha_S$ of the block 5 having a shorter surface length. As shown in FIG. 2, the inclination angle $\alpha$ ($\alpha_L$, $\alpha_S$) is an inclination angle of a wall face $2_W$, $3_W$ with respect to a normal line HL of the tire passing through an edge of the block 5 perpendicular to the ground contact region 1.

According to the invention, it is required to always and simultaneously establish the relationships of $\phi_L > \phi_S$ and $\alpha_L > \alpha_S$. Because, in case of $\phi_L > \phi_S$, the rigidity in the axial direction of the long-pitch block S per unit length along the circumference of the ground contact region 1 can be more increased by $\alpha_L > \alpha_S$, while the rigidity in the axial direction of the short-pitch block 5 can be relatively decreased as compared with the case of the long-pitch block 5, whereby it is possible to make the rigidities in the axial direction of long-pitch and short-pitch blocks 5 even. Thus, it is possible to improve both the straight running stability and the steering stability of the vehicle.

For example, if a parallelogram block having an inclination angle ( of 30° and a pitch of 1.00 is a basic block, there are provided two kind of blocks having a constant block width, in which one of the blocks is a long-pitch block formed by extending opposed acute portions of the basic block along the circumference of the ground contact region so as to obtain a pitch of 1.222 (shape similar to the block located in $P_L$ of FIG. 1) and the other of the blocks is a short-pitch block formed by shortening the opposed acute portions so as to obtain a pitch of 0.778 (shape similar to the block located in $P_S$ of FIG. 1). Then, the inclination angle $\alpha_S$ of the short-pitch block is made constant at $\alpha_S = 0°$, while the inclination angle $\alpha_L$ of the wall face $2_W$, $3_W$ of the long-pitch block is set to various levels, whereby a value of rigidity ratio in axial direction represented by (axial rigidity of long-pitch block)/(axial rigidity of short-pitch block) in the blocks per unit length along the circumference of the ground contact region (hereinafter referred to as circumferential direction) is measured by means of FEM. The results are shown in FIG. 6.

Figure 6:
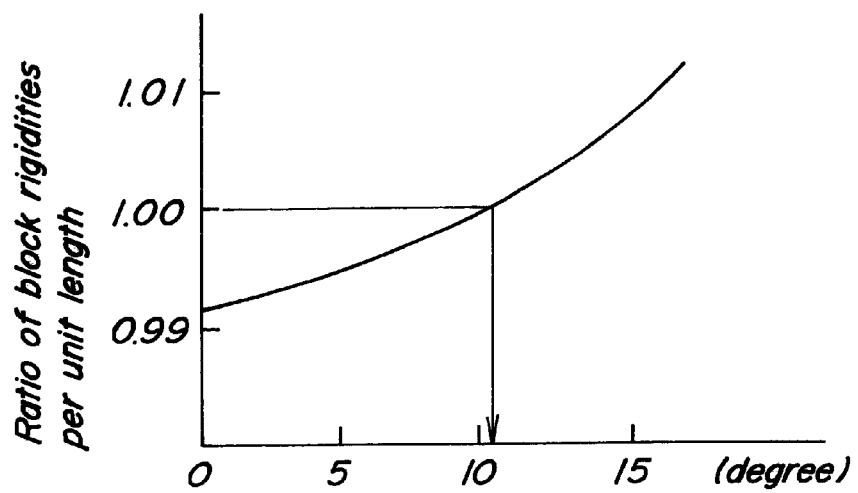
FIG. 6 is a graph showing a relation between a rigidity ratio of a block in an axial direction and an inclination angle of a wall face of a long-pitch block.

As seen from FIG. 6, in the case that the short-pitch block has a constant inclination angle of $\alpha_S = 0°$, an optimum rigidity ratio in the axial direction of 1.0 is obtained when the inclination angle $\alpha_L$ of the long-pitch block somewhat exceeds 10°. In general, as the difference between the inclination angle $\phi_L$ in the long pitch $P_L$ and the inclination angle $\phi_S$ in the short-pitch $P_S$ increases, it is required that the inclination $\alpha_L$ of the long-pitch block is made larger than the inclination angle $\alpha_S$ of the short-pitch block. However, $(\alpha_L - \alpha_S) = \Delta\alpha$ is desirable to be substantially within a range of $(\phi_L/5) \sim (\phi_L/2)$.

Next, the line III—III of FIG. 1 is a straight line extending in parallel to the equatorial plane E of the tire. As shown in FIG. 3, the inclination angle $\beta$ of each wall face $4_w$ of the block 5 facing the sub-groove 4 with respect to the surface length of the block along the circumference of the ground contact region is defined in such a manner that the inclination angle $\beta_L$ of the block 5 having a longer surface length in the long pitch $P_L$ and the inclination angle $\beta_S$ of the block 5 having a shorter surface length in the short pitch $P_S$ satisfy the relationship of $\beta_S > \beta_L$.

The rigidity of the block 5 in the circumferential direction per unit length of the ground contact region in the widthwise direction is larger in the long-pitch block having a longer circumferential length than in the short-pitch block having a shorter circumferential length, so that when the block row satisfies the relationship of $\beta_S > \beta_L$ as mentioned above, the rigidity of the block row in the circumferential direction can be evened and uniformized. Thus, it is possible to improve both the straight running stability and steering stability of the vehicle likewise the case of the block row simultaneously satisfying $\phi_L > \phi_S$ and $\alpha_L > \alpha_S$.

The formation of the block row simultaneously satisfying the relationships of $\phi_L > \phi_S$ and $\alpha_L > \alpha_S$ and the formation of the block row satisfying the relationship of $\beta_S > \beta_L$ can attain the improvement of the above two performances alone, respectively. And also, it is possible to form the block row simultaneously satisfying the relationships of $\phi_L > \phi_S$, $\alpha_L > \alpha M_S$ and $\beta_S > \beta_L$. In the latter case, the rigidity distribution in both the axial direction and the circumferential direction can be evened, whereby both the straight running stability and the steering stability of the vehicle can be more improved as compared with the former case. In FIGS. 2 and 3, the wall faces $2_W$, $3_W$, $4_W$ of the block 5 are connected to the respective groove bottom through small chamfered parts r.

Figure 4:
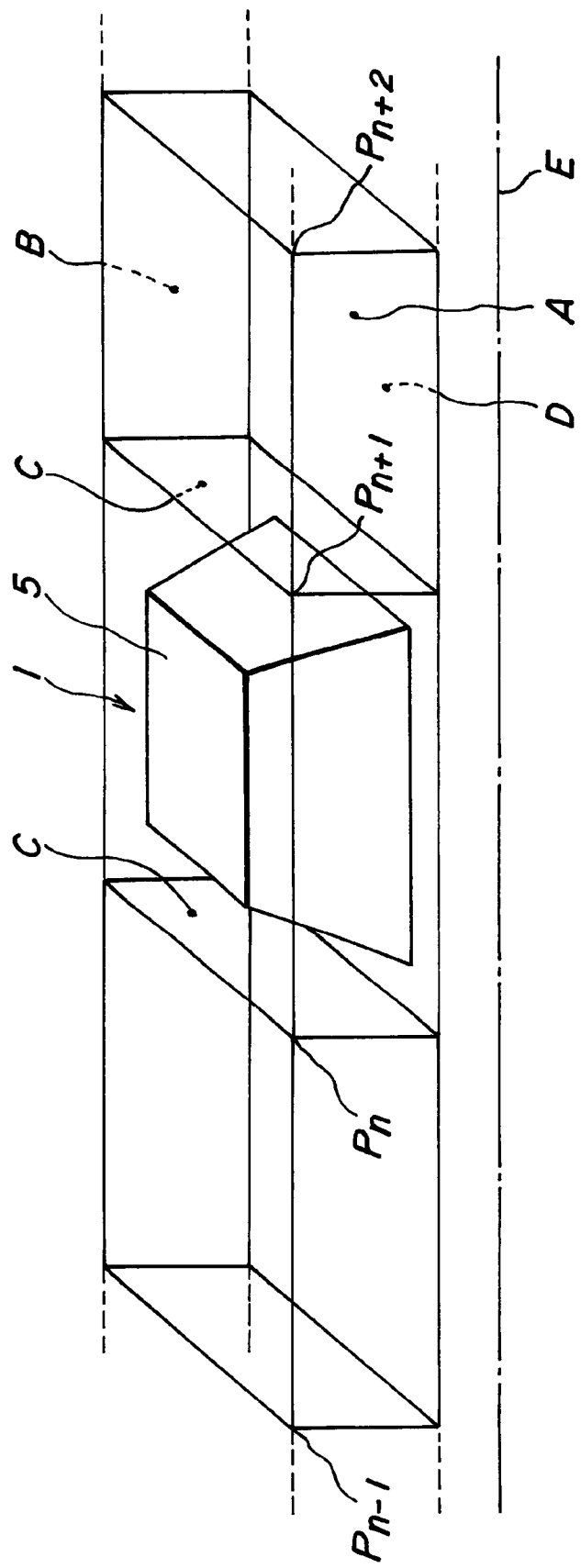
FIG. 4 is a perspective view of a block viewed from an arrow IV of FIG. 1.

In FIG. 4 is perspectively shown planes A, B including width bisector lines AL, BL of the main grooves 2, 3 and widthwise centers $2b$, $3b$ of the groove bottoms of the main grooves 2, 3 shown in FIGS. 1 and 2, faces C including width bisector lines CL and widthwise groove bottom centers of the sub-grooves 4 shown in FIGS. 1 and 3 (there are plane and curved face, but the plane is used in the figure), a curved face D connecting bottoms of the grooves 2, 3, 4 to each other, and one block 5. The plane A and face C include points $P_{n-1}$, $P_n$, $P_{n+1}$, $P_{n+2}$ defining the pitch.

In the invention, it is favorable that a ratio of full volume of block 5 to grooves 2, 3, 4 existing in a full volume of one pitch defined by two faces C, planes A, B and curved face D including mutually adjacent points of the points $P_{n-1}$, $P_n$, $P_{n+2}$ defining the pitch, e.g. points $P_n$ and $P_{n+1}$ shown in FIG. 4 is made even over a full circumference of the ground contact region 1. The word "even" used herein means that the difference between maximum value and minimum value in the above ratio is not more than 0.1.

Thus, the change of tread rubber gauge as a sum of groove depth and skid base gauge between mutual pitches can be minimized. This prevents the degradation of RFV (radial force variation) due to the change of the gauge and hence the degradation of the straight running stability during the high-speed running based on RFV and fulfils the effect by the relationships of $\phi_L > \phi_S$ and $\alpha_L > \alpha_S$, the effect by the relationship of $\beta_S > \beta_L$, or the effect by the relationships of $\phi_L > \phi_S$, $\alpha_L > \alpha_S$ and $\beta_S > \beta_L$.

Figure 5:
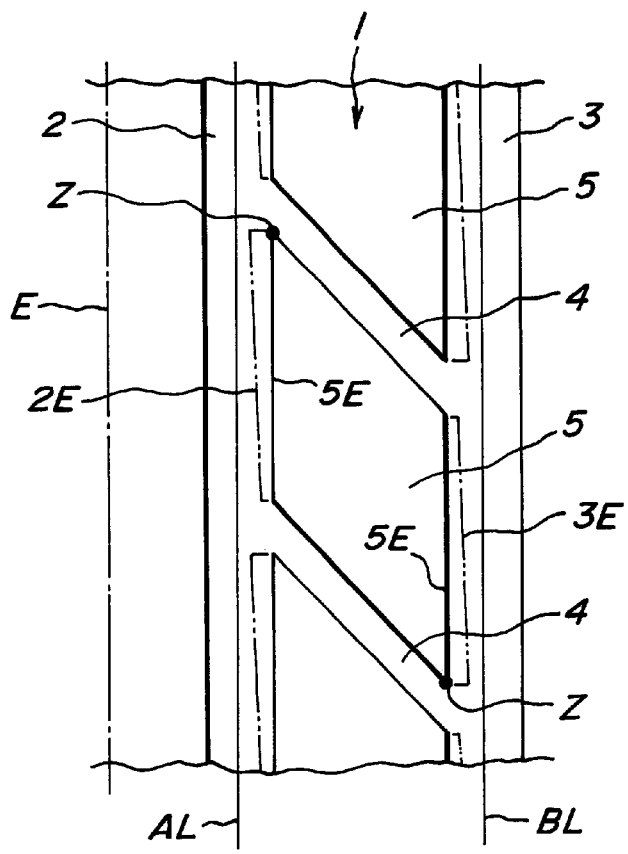
FIG. 5 is a partial developed view of another embodiment of the tread pattern illustrating a wall face of the block in the straight main groove.

FIG. 5 shows a case that the inclination angles $\alpha$ of the wall faces $2_W$, $3_W$ of each block 5 ranging from side edges 5E of the main grooves 2, 3 to groove edges 2E, 3E are gradually increased in a zone ranging from an obtuse end of the block 5 to an acute end Z thereof, in which the groove edges 2E, 3E as an intersect between the wall face $2_W$, $3_W$ and a portion of the groove bottom excluding the chamfered part r are shown by a phantom line. In this case, the rigidity of the block 5 in the widthwise direction of the ground contact region is improved, which particularly contributes to the improvement of the steering stability.

The following examples are given in illustration of the invention and are not intended as limitations thereof.

There are provided radial tires for a passenger car each having a tire size of 245/40ZR18, in which a radial carcass is comprised of two rubberized plies containing rayon cords of 1650d/3 therein and a belt is comprised of two steel cord cross layers, one cap ply and one layer covering both ends thereof.

The tire has a tread pattern formed by arranging two block rows as shown in FIG. 1 on each side of the equatorial plane E of the tire, in which inclining directions of the sub-grooves 4 have a herringbone form with respect to the equatorial plane E. That is, the tread pattern has four block rows in total. Each of these block rows has a pitch variation of distributing five kind of pitches comprised of a basic pitch of 1.000, two short pitches of 0.889 and 0.778 and two long pitches of 1.111 and 1.222 according to a given rule, in which an inclination angle φ of the block in the basic pitch facing a sub-groove 4 is 30°.

The blocks having the short pitches of 0.889 and 0.778 have a shape formed by shortening a block length of a diamond-shaped basic pitch block to approach opposed acute ends Z of the basic pitch block to each other, while the blocks having the long pitches of 1.111 and 1.222 have a shape formed by extending the block length of the basic pitch block to extend away the opposed acute ends Z from each other.

In the tires of Examples 1 and 2 and Conventional Example, various dimensions such as value of ratio of maximum pitch length to minimum pitch length of the block 5 (maximum value of pitch ratio), number of pitch lengths (kind of pitches), pitch arrangement, groove depth of main grooves 2, 3 and sub-groove 4, inclination angle φ of edge of the block 5 facing the sub-groove 4, inclination angles α, β of wall faces of the block 5 and the like are shown in Table 1, provided that in each column of the inclination angles φ, α and β of Table 1, value of inclination angle in maximum pitch length is indicated at a left-side end and value of inclination angle in minimum pitch length is indicated at a right-side end.

The straight running stability, overall steering stability, ride comfortability and pattern noise as a test item are evaluated by an actual running test after each of the above tires is assembled onto a rim of 8J–18 and inflated under an internal pressure of 2.0 kgf/cm² and then mounted onto each wheel of a four-wheeled vehicle having a displacement of 5000 cc. The evaluation is carried out by five drivers and an average of the evaluated values is represented by an index on the basis that the conventional example is 100, in which the larger the index value, the better the performance. The evaluated results are also shown in Table 1.

As seen from the results of Table 1, the straight running stability and overall steering stability in the tires of Examples 1 and 2 are largely improved as compared with the conventional tire while maintaining other performances such as ride comfortability, pattern noise and the like. Particularly, the effect of improving the overall steering stability is remarkable.

As mentioned above, according to the invention, there can be provided pneumatic radial tires having considerably improved straight running stability and steering stability while maintaining other performances such as ride comfortability, pattern noise and the like.

What is claimed is:

1. A pneumatic radial tire comprising; a radial carcass of at least one ply toroidally extending between a pair of bead cores, each bead core embedded in a bead portion, a belt reinforcing a tread portion on an outer periphery of the carcass, and a row of multiple blocks having different lengths along a circumference of a ground contact region under a pitch variation defined in a tread rubber of the tread portion by at least two straight main grooves extending along the circumference of the ground contact region and a plurality of lateral sub-grooves extending between the mutual main grooves at an inclination angle of less than 90° with respect to the circumference of the ground contact region, in which the block row satisfies a relationship of $\phi_L > \phi_S$ of an inclination angle ($\phi$) of an edge of the block along the sub-groove with respect to a straight line passing through a top of an acute angle portion of the block and perpendicular to an equatorial plane of the tire wherein, $\phi_L$ is an inclination angle of a long-pitch block and $\phi_S$ is an inclination angle of a short-pitch block, wherein said block satisfies a relationship of $\alpha_L > \alpha_S$ of an inclination angle ($\alpha$) of each block wall face along both the straight main grooves with respect to a normal line of the tire passing through an edge of the block perpendicular to the ground contact region and wherein, $\alpha_L$ is an inclination angle of a block wall face in a block having a longer surface length and $\alpha_S$ is an inclination angle of a block wall face in a block having a shorter surface length.

2. A pneumatic radial tire according to claim 1, wherein the block row satisfies a relationship that as to an inclination angle ($\beta$) of each block wall face along the sub-groove with respect to a normal line of the tire passing through an edge

TABLE 1

| Items | Conventional Example | Example 1 | Example 2 |
| --- | --- | --- | --- |
| Maximum value of pitch ratio | 1.571 | 1.571 | 1.571 |
| Kind of pitches | 5 | 5 | 5 |
| Pitch arrangement | random | random | random |
| Groove depth (mm) | 8 | 8 | 8 |
| Inclination angle of edge φ) (degree) | | maximum-pitch-minimum 37, 33, 30, 27, 23 | |
| Inclination angle of wall face α (degree) | 5.0 | maximum-pitch-minimum 10, 7.5, 5, 2.5, 0 | 7.0 |
| Inclination angle of wall face β (degree) | 5 | maximum-pitch-minimum 5 | maximum-pitch-minimum 0, 2.5, 5, 7.5, 10 |
| Straight running stability | 100 | 105 | 104 |
| Overall steering stability | 100 | 109 | 107 |
| Ride comfortability | 100 | 101 | 101 |
| Pattern noise | 100 | 100 | 100 | of the block perpendicular to the ground contact region, an inclination angle ($\beta_S$) of a block wall face in a block having a shorter surface length is made larger than an inclination angle ($\beta_L$) of a block wall face in a block having a longer surface length.

3. A pneumatic radial tire according to claim 1, wherein a ratio of a full volume of a block to a full volume of a groove existing in each pitch defined by different pitch lengths based on the pitch variation is made even over a full circumference of the ground contact region.

4. A pneumatic radial tire according to claim 1, wherein the inclination angle of a block wall face of the block from a surface of said block toward the bottom of a main groove is gradually decreased over a region ranging from an acute end to an obtuse end of each block.

* * * * *